United States Patent
Meetz et al.

(10) Patent No.: US 8,145,012 B2
(45) Date of Patent: Mar. 27, 2012

(54) DEVICE AND PROCESS FOR MULTIMODAL REGISTRATION OF IMAGES

(75) Inventors: Kirsten Meetz, Hamburg (DE); Heinrich Schulz, Hamburg (DE); Jens Berg, Hamburg (DE); Joerg Sabczynski, Norderstedt (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1039 days.

(21) Appl. No.: 10/598,005

(22) PCT Filed: Feb. 4, 2005

(86) PCT No.: PCT/IB2005/050468
§ 371 (c)(1),
(2), (4) Date: Sep. 17, 2007

(87) PCT Pub. No.: WO2005/083629
PCT Pub. Date: Sep. 9, 2005

(65) Prior Publication Data
US 2008/0107312 A1 May 8, 2008

(30) Foreign Application Priority Data
Feb. 20, 2004 (EP) .................................. 04100689

(51) Int. Cl.
G06K 9/32 (2006.01)
G06K 9/00 (2006.01)
G06K 9/40 (2006.01)
G06K 9/20 (2006.01)
A61B 5/05 (2006.01)

(52) U.S. Cl. ........ 382/294; 382/128; 382/131; 382/132; 382/260; 382/282; 382/283; 128/922; 600/407; 600/410

(58) Field of Classification Search .................... None
See application file for complete search history.

(56) References Cited

U.S. PATENT DOCUMENTS
5,633,951 A * 5/1997 Moshfeghi .................... 382/154
6,618,490 B1 9/2003 Cham et al.
(Continued)

FOREIGN PATENT DOCUMENTS
WO    WO 01/78010 A2   10/2001

OTHER PUBLICATIONS

Lin, K-P., et al.; A General Technique for Interstudy Registration of Multifunction and Multimodality Images; 1994; IEEE Trans. on Nuclear Medicine; 41(6); pp. 1106-1110.*

(Continued)

Primary Examiner — Tom Y Lu
Assistant Examiner — Thomas Conway

(57) ABSTRACT

The invention relates to a device and a process, with which images of different imaging methods can be registered, for example preoperatively obtained 3D X-ray images (A) and intra operatively obtained ultrasound images (B). First transformed images (A',B') are then generated in a data processing device (10), which are aligned to each other with regard to the peculiarities of each imaging method. Particularly from the three dimensional CT-image (A), can be generated a two dimensional image (A') which adheres to the characteristic means of representation of an ultrasound system, while shaded areas behind bones and/or gas-filled volumes can be blended out. With a feature-based registration of the transformed images (A', B') errors are avoided, which are traced back to artifacts and peculiarities of the respective imaging methods.

19 Claims, 2 Drawing Sheets

U.S. PATENT DOCUMENTS

Figure 1:
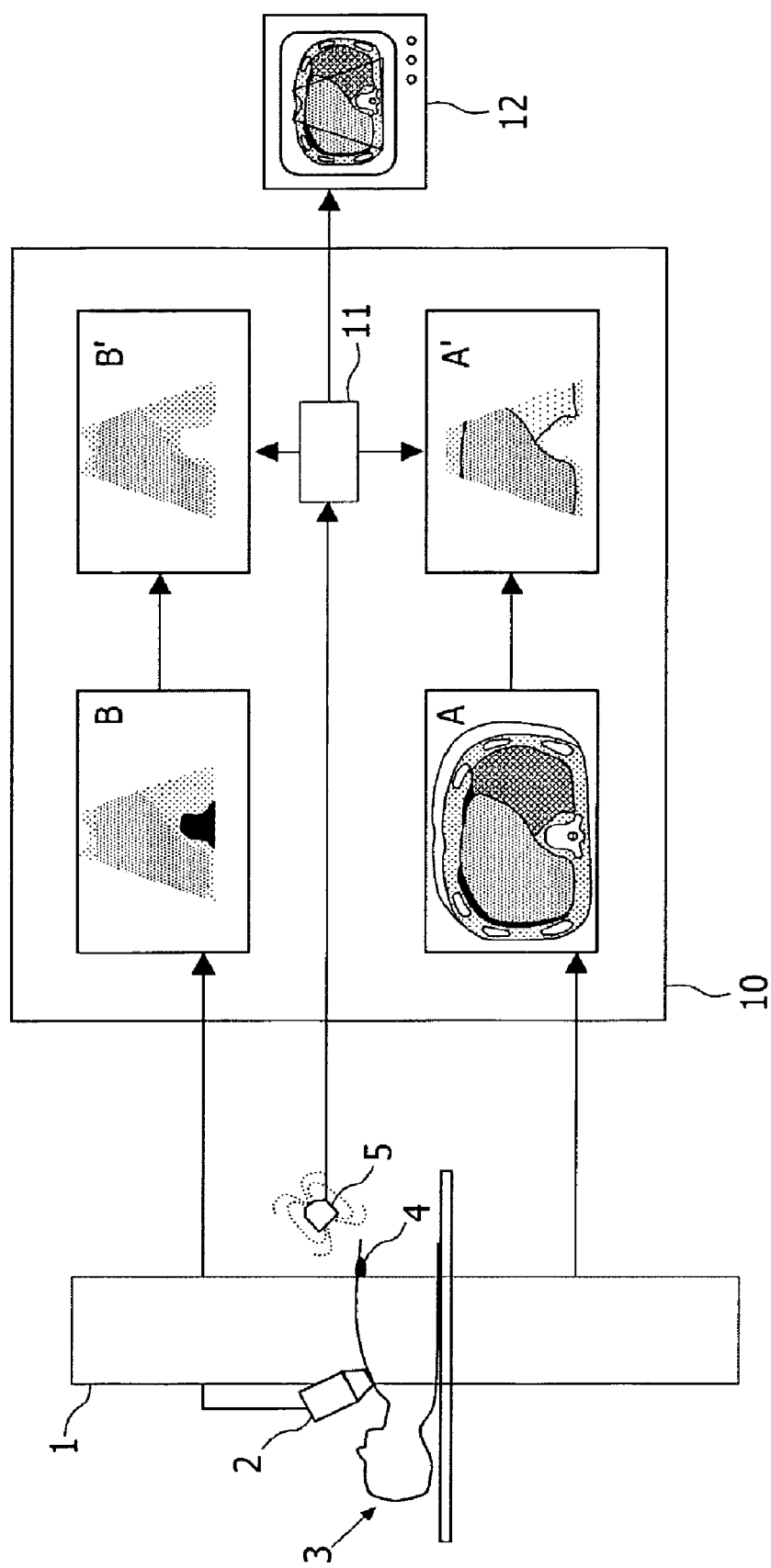

| | | | | |
|---|---|---|---|---|
| 7,103,399 B2 * | 9/2006 | Miga et al. | ............ | 600/425 |
| 7,106,891 B2 * | 9/2006 | Wyman et al. | ............ | 382/128 |
| 7,397,934 B2 * | 7/2008 | Bloch et al. | ............ | 382/128 |
| 7,639,896 B2 * | 12/2009 | Sun et al. | ............ | 382/294 |
| 7,647,087 B2 * | 1/2010 | Miga et al. | ............ | 600/425 |
| 7,657,299 B2 * | 2/2010 | Huizenga et al. | ............ | 600/410 |
| 7,822,241 B2 * | 10/2010 | Eck et al. | ............ | 382/128 |
| 2001/0036302 A1 | 11/2001 | Miller | | |
| 2003/0146913 A1 | 8/2003 | Shen et al. | | |

OTHER PUBLICATIONS

Pluim et al.; Mutual-Information-Based registration of Medical Images: A Survey; 2003; IEEE Trans. on Medical Imaging, 22(8); pp. 986-1004.*

Maintz, J.B.A., et al.; A survey of medical image registration; 1998; Medical Image Analysis; 2(1); pp. 1-36.*

Andersson, J.L.R., et al.; A Method for Coregistration of PET and MR Brain Images; 1995; Journal of Nuclear Medicine; 36(7)1307-1315.

Lin, K-P., et al.; A General Technique for Interstudy Registration of Multifunction and Multimodality Images; 1994; IEEE Trans. on Nuclear Medicine; 41(6)1106-1110.

Maintz, J.B.A., et al.; A survey of medical image registration; 1998; Medical Image Analysis; 2(1)1-36.

VonBerg, J., et al.; A hybrid method for registration of interventional CT and ultrasound images; 2004; Proc. of Int. Cong. and Exhib. on Computer Assisted Radiology and Surgery; 1268:492-497.

Woods, R.P., et al.; MRI-PET Registration with Automated Algorithm; 1993; J. Computer Assisted Tomography; 17(4)536-546.

Ashburner et al: "Multimodal Image Coregistration and Partitioning—a Unified Framework"; Neuroimage, vol. 6, 1997, Article No. N1970290, pp. 209-217.

* cited by examiner

DEVICE AND PROCESS FOR MULTIMODAL REGISTRATION OF IMAGES

The invention relates to a data processing device and a method for registration of a first image of an object, which first image was obtained with a first imaging method, having a second image of the object, which second image was obtained with a different imaging method, particularly with a different modality.

Surgical operations are generally planned with the help of preoperative generated images of the operation area, wherein the images, for example could be obtained through (X-ray) Computer Tomography, Magnetic Resonance process or X-ray projections and show the anatomical or pathological characteristics of the patient. For minimal invasive operations, wherein the operation area is not directly visible, as a rule, additional intra-operatively obtained images are necessary. Particularly, changes in the anatomy can be detected with intra-operative images (for e.g. displacement of organs through intervention or movement like breathing or heart beats of the patient) as well as surgical information like the position of the surgical instruments. However, Magnetic Resonance (MR) process or Computer Tomography (CT) are less suited for the generation of intra-operative images, as their possibilities of use in an operation theatre or an intervention area are limited and they typically do not provide images in real time.

Ultrasound processes are, in comparison, well usable for generating intra-operative images. Since the surgeon, as a rule, manually controls the ultrasound probe and therein the image geometry constantly changes, it is however, difficult for him to make the ultrasound image mentally coincide with a preoperative three-dimensional MR/CT image. In this regard, a process known from WO 01/78010 A2, with which preoperatively obtained CT or MR images of a tube structure, can be registered with intra-operative ultrasound images. With such a registration of images of different modalities, the problem lies in the fact, that on the basis of different characteristic image features of the modalities, the resulting images represent the same object differently. This makes a desirable feature-based registration of images more difficult.

Against this background it was an object of the invention at hand, to provide means for improved registration of different images.

The data processing device according to the invention helps the registration of a first image of an object with a second image of the object, wherein the first image was obtained with a first imaging method and the second image was obtained with a second imaging method different from the former. The difference in the imaging methods can therein exist particularly in the usage of different modalities. With reference to the situation described above, the first image could be for example a three-dimensional CT image and the second image could be an intra-operative ultrasound image. The difference in the imaging methods could however, also exist in the usage of different exposure conditions (protocols) for the same modality, for e.g. with CT images with and without contrast means doses or with MR images with different image parameters. The data processing apparatus is further arranged for executing the following steps:

a) The generation of a first transformed image from said first image, wherein in this transformed image, characteristic image features of the first imaging method are reduced and /or characteristic image features of the second imaging method are intensified. A characteristic imaging feature of the imaging method "Ultrasound" is for example representing the shading behind the bones or gas-filled volumes as well as representing different tissues distortedly, depending upon the sound velocity of the sound signal. In the first transformed image an alignment with the second image takes place, as characteristics going back to the related first imaging method are reduced and/or as image features are intensified or generated, which had appeared while the image is generated with the help of the second imaging method.

b) The generation of a second transformed image from the second image, wherein, optionally, characteristic image features of the second imaging method are reduced in the second transformed image and/or optionally characteristic imaging features of the first imaging method are intensified. Analogous to step a), starting from the second image and the associating second imaging method, an alignment with the way of viewing and representation of the first image is effected.

Since it is frequently sufficient to align one of both the original images with reference to the different imaging methods of the other image, the second transformed image particularly, can also be identical with the original second image (i.e. the transformation is the identity). In this case, viewing the second "transformed" image is simply for formal reasons, in order to standardize the representation of the process.

c) The registration of the transformed images obtained in step a) and b). By "registration" it is understood, as customary, the mutual relation of object points in different images. Registered images can be particularly represented overlapping each other in such a way, that the pixels, which belong to the same object point, coincide. Further, it goes without saying that with the registration of the transformed images, even the related registration of the original (first and second) images is known, so that these can be for example represented overlapping each other on the monitor.

In the described data processing device, images from different imaging methods are aligned to each other before their registration, at first with reference to the characteristic image behaviour of the methods. Through this the unusual characteristics of an imaging method, which could lead to wrong registrations of the original images, can be eliminated. In the transformed images only such structures are essentially included that are reproduced in about the same way as regards a selected usage-specific degree of similarity by the imaging methods involved. In this way the images can be registered with higher accuracy in spite of their origin from different imaging methods.

As has just been elucidated, the first and second imaging methods can comprise the usage of different modalities. In this case, the modalities involved can be particularly a computer tomography, an X-ray projection or a magnetic resonance process, wherein the associated image can be two dimensional or even three dimensional. This can be particularly applicable to the first modality, which is the basis of the generation of the first image. Two or three-dimensional images, which are generated with one of the modalities mentioned, are particularly suitable as preoperative images for planning a surgical operation. Further one of the modalities can be an ultrasound-imaging process, a (real-time) magnetic resonance process, an X-ray fluoroscopy or a CT-fluoroscopy. Preferably in this case it concerns the second modality, which is then particularly suitable for the intra-operative observation of a surgical operation.

Figure 2:
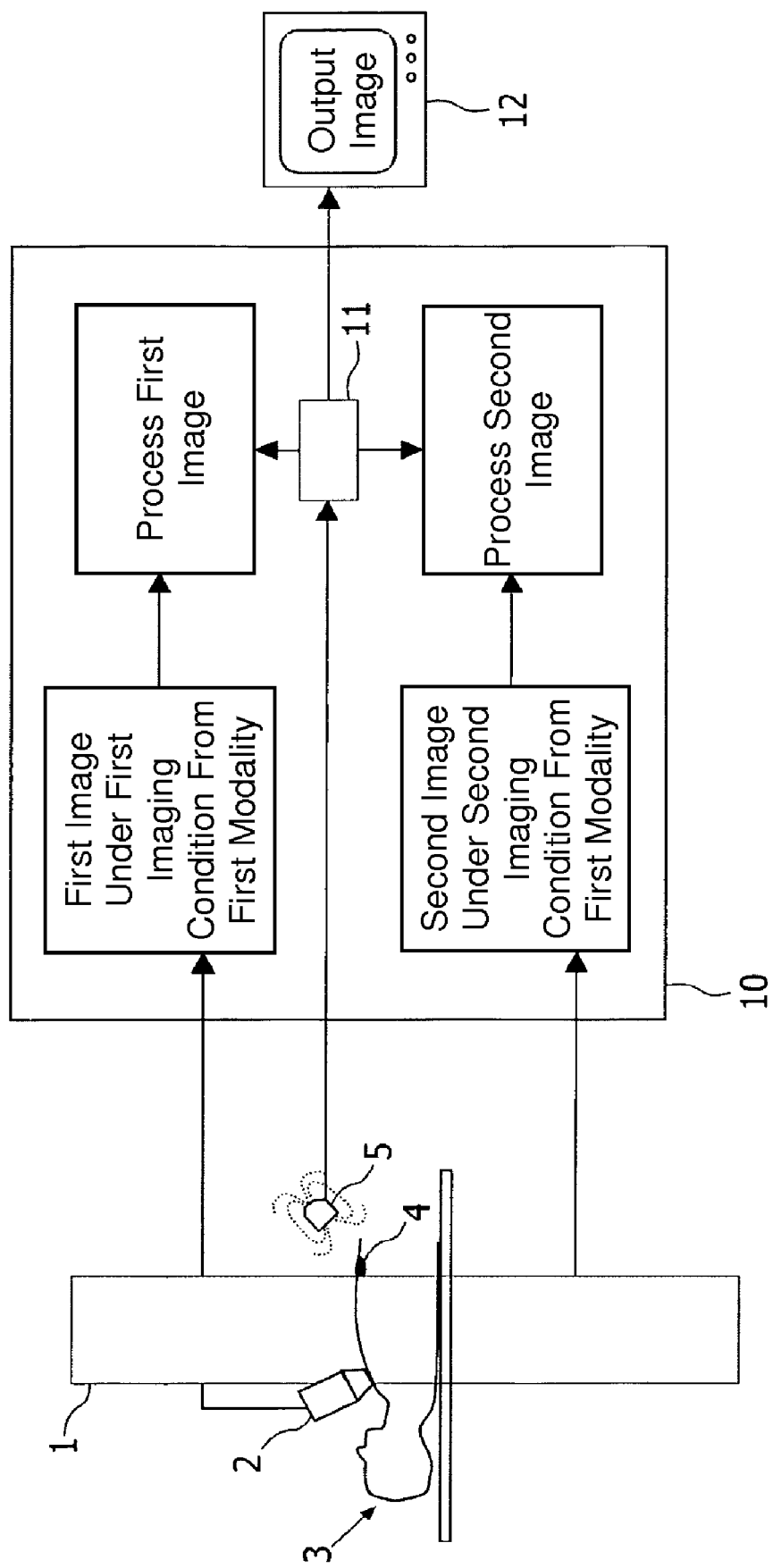

Alternatively, the difference in the imaging methods can also lie in the fact, that the images with the same modality are generated in different imaging conditions (see FIG. 2). For example the first image can be a preoperative X-ray image with a contrast means dose, while the second image is an X-ray image without contrast means.

For the registration method started in step c) principally all the suitable arrangements and algorithms are available. Preferably, it can be a matter of a feature-based registration of the transformed images. That is, that in the transformed images, image-based features like for e.g. intensity distributions are detected, which show vascular branchings, organs or organ boundaries, bones, implants and the like, so that the images can finally be transformed on the basis of the features. The advantageous aspect of the feature-based registration is that it makes specific structures and objects congruent, which as a rule, is particularly relevant for the application.

In accordance with another version of the data processing device, it can be arranged to segment object areas having different material composition in at least one of the images (i.e the first image, second image or in one of the transformed images). Such segmenting applying to the object material is helpful with the generation of transformed images, as different image behaviour of different imaging methods is connected as a rule to different materials of the object. Thus for example bones or gas-filled volumes have a high significance for the ultrasound process, as they are practically non-transparent for this method and the areas behind them contain only artifacts instead of relevant information about the object. Therefore if such material areas of the object can be determined on an MR or CT scan, a prognostication can be made about the representation of the object with an ultrasound process.

In accordance with another version of the data processing device, which can be used particularly in connection with the image mentioned above, areas of one or both the transformed images can be masked, in which at least one of the imaging methods does not provide any reliable image information. The masking of such areas leads as per the definition, to the fact that these are not considered during a registration of the transformed images. Therein is ensured, that the registration basically takes place in areas, which are depicted similarly by both imaging methods. With the masking for example areas behind bones or air filled volumes can be excluded, which are shaded in the ultrasound images.

In order to increase the precision of the registration further, additional information can be used. Particularly, object points coinciding with measured positions and/or a calibration of the images with the registration for example in the form of start values can be taken into consideration.

In accordance with another version of the data processing device, it can be in a position to use the method of flexible registration of image content. In this way, effects of deformation of the tissue and/or of an organ shift can be taken into consideration.

The invention further relates to a process of registration of a first image of an object, which was obtained with a first modality, with a second image of the object, which was obtained by a second modality different from the first modality, comprising the following steps:

a) The generation of a first transformed image from the first image, in which characteristic image features of the first modality are reduced and/or characteristic image features of the second modality are intensified.
b) The generation of a second transformed image from the second image, in which optional characteristic image features of the second modality are reduced and optional characteristics image features of the first modality are intensified.
c) The registration of the transformed images, which can preferably be effected iteratively.

The process generally comprises the steps carried out with a data processing device as elucidated above. Consequently, with respect to the details, advantages, and additional setting up, the above description is referred.

In accordance with another version of the method steps a), b) and c) are repeated many times with variation, at least of one of the transformed images, in order to maximize a similarity between the obtained transformed images iteratively in this way. With such an iteration of the process the precision of the registration can be increased, wherein however, already an early first (preliminary) result is available and can be used for example on a monitor for a display.

In the following, the invention is elucidated by way of example with the help of the appended FIGS. 1 and 2. FIG. 1 schematically depicts the usage of a data processing device according to the invention for registration of CT images and ultrasound images. FIG. 2 depicts usage of a data processing device for registration of images with the same modality.

Although the process according to the invention is elucidated below by way of an example of a surgical operation, it is not limited to medical applications. Rather, it is usable in all cases, where images should be registered, which were obtained with different modalities.

In the left portion of FIG. 1 is a diagrammatic representation of the situation with a medical operation on a patient 3. To prepare for the operation, three-dimensional X-ray images A are taken of the operation area with a CT unit 1 and stored in a data processing device 10 (workstation). The data processing device 10 can be arranged for considering positions measured with the help of a position-measuring apparatus (e.g., part of the data processing device 10) or a calibration of the images during the registration. The data processing device 10 can perform a process that includes generating the first transformed image, generating the second transformed image, and registering the first transformed image and the second transformed image. The data processing device 10 can repeat generating the first transformed image, generating the second transformed image, and registering the first transformed image and the second transformed image at least a second time with variation of at least one of the transformed images, in order to maximize a degree of similarity between the transformed images.

When the surgical operation has to be minimally invasive, for example with a catheter or an intervention needle, a real-time observation of the operation is necessary during the operation. To this end an ultrasound apparatus 2 is provided, which can be manually controlled by the doctor and provides the data processing device 10, with a two-dimensional sectional view B of the body volume. In order to make it easier for the doctor to interpret the actual ultrasound images, it is desirable to register this with the corresponding layer from the preoperatively obtained three-dimensional CT image A and to represent both images superimpose correctly on a monitor 12.

In order to quickly take a good registration of the images A, B in spite of their origin from different modalities, the process further elucidated below is carried out. The process is then typically implemented through commands for a computing unit 11 (CPU) of computer 10, i.e. in the form of program code or software respectively. The program code may be located for example in a memory (RAM, hard disk etc.) of computer 10 or on changeable storage media (disc, CD, magnetic tape etc.). The object of the process is to align the original images A, B to each other before the registration, so that peculiarites which underlie each of the modalities are reduced and the ways of representation get aligned to each other. This can particularly be done with the following method steps:
1. Segmenting the three-dimensional CT-image A in areas of different material composition, for e.g. bones, air, soft tissue etc.
2. Generating a two-dimensional test image from the original CT image A, wherein the characteristic image features of an ultrasound system are taken into consideration. With this taking into consideration, particularly the result of the segmenting from the preceding step is used, as different materials represent differently on an ultrasound image. Further a certain position and orientation of the ultrasound apparatus is adopted by way of test.
3. Masking areas in the test image mentioned above, which would not contain any reliable image information about the object when generated by an ultrasound process. Therein, shadings particularly behind bones and/or behind air inclusions (for e.g. in the intestine or in the lungs) can be masked, i.e. can be cropped from the image. As a result of steps 1 to 3, a transformed (test) image A' is obtained.
4. Generating a transformed ultrasound image B', while the original ultrasound image B is limited to the non-masked areas of the transformed image A'.
5. Registration of the transformed test image A' and the transformed ultrasound image B' and calculation of the degree of similarity between these images.
6. Maximizing the degree of similarity, while the steps 2 to 5 are repeated for different two-dimensional test images from the original image A. For example the position taken of the ultrasound probe can be varied in different test images.

At the end of the method explained above, a very precise and robust registration of the original images A and B is known. This can normally be used for example for representing the intraoperative ultrasound B image superimposed on the preoperative CT image A on a monitor 12.

The core thought of the method according to the invention, is therefore aligning the images A and B to each other, obtained with different modalities first with reference to peculiarities of modalities. This can be effected, as described above in that one of the images (A) is transformed in the direction of the image features of the other modality (ultrasound), whereas the other image (B) basically remains unchanged. However, it would also be possible to also use the ultrasound image B additionally or alternatively as a starting point for a modality transformation. Further it is conceivable to transform the original images A, B independently of the other modality, for the moment in an intermediate representation, which shows only modality-independent image characteristics. Such intermediate representations can then be registered with any image from other imaging methods.

The explained process can naturally also be used with other modalities than those represented. For example, instead of the CT 1 a magnetic resonance process can be used for generating three-dimensional images A. Similarly, the intra-operatively used ultrasound system 2 could be replaced by a real-time MR system and/or a CT-fluoroscopy.

Through a position measuring system and/or a calibration procedure of the relevant imaging modalities, suitable start values for the optimizing process explained above could further be generated automatically. With reference to this, FIG. 1 represents as an example an electromagnetic localization system with a magnetic field probe 4 on the patient's body and a field generator 5, which send their measuring data through the spatial position of the patient to the registration module 11. Naturally other devices like for example optical localization systems are also usable for this purpose. From a calibration of the imaging apparatus (X-ray, ultrasound) it can be further known, which pixel and voxel respectively belongs to which space point in relation to the apparatus, or in other words how the generated image is positioned in a coordinate system relating to the apparatus. If further the space position of the image device is known, then the absolute space position of a pixel can be concluded. Further, if it is the case for many or all image devices, then as an end step of the calibration, the device-related coordinate system can be transformed into each other. In this way a pre-selection of the two-dimensional test image generated in step 2 can be made.

In order to be able to take the deformation of tissues and/or the movement of organs into consideration with the image registration, the use of flexible registration processes is further possible. Such processes are described for example. by B. A. Maintz and M. A. Viergever, "A survey of medical image registration" (Medical Image Analysis, vol. 2, no. 1, S 1-36, 1998).

The invention claimed is:
1. A data processing device for registration of a first image of an object, which first image was obtained with a first imaging method having a second image of the object, which second image was obtained with a second imaging method different from the first imaging method, wherein the data processing device is equipped for executing the following steps:
  a) generating a first transformed image from the first image, in which characteristic image features of the first imaging method are reduced or characteristic image features of the second imaging method are intensified, where the first transformed image and the first image are different images;
  b) generating a second transformed image from the second image, in which, optionally characteristic image features of the second imaging method are reduced and optionally, characteristic image features of the first imaging method are intensified, where the second transformed image and the second image are different images, where areas of at least one of the transformed images are masked and where at least one of the imaging methods does not supply reliable information; and
  c) registering the transformed images.
2. A data processing device as claimed in claim 1, wherein the imaging methods comprise the application of different modalities, wherein one of the modalities is a computer tomography, an X-ray projection, a magnetic resonance imaging method, an ultrasound method, an X-ray fluoroscopy or a CT-fluoroscopy and wherein the image obtained thereby is two dimensional or three dimensional.
3. A data processing device as claimed in claim 1, wherein the imaging methods were generated with the same modality with different imaging conditions.
4. A data processing device as claimed in claim 1, which is arranged for executing a feature-based registration of the transformed images.
5. A data processing device as claimed in claim 1, which is arranged for segmenting object areas with different material composition in at least one of the images.
6. A data processing device as claimed in claim 1, which is arranged for considering positions measured with the help of a position-measuring apparatus or a calibration of the images during the registration.
7. A data processing device as claimed in claim 1, being equipped for executing the following steps:

generating a first transformed image from the first image, in which characteristic image features of the first imaging method are reduced; and generating a second transformed image from the second image, in which characteristic image features of the second imaging method are reduced.

8. A data processing device as claimed in claim 1, being equipped for executing the following steps:

generating a first transformed image from the first image, in which characteristic image features of the first imaging method are reduced; and generating a second transformed image from the second image, in which, characteristic image features of the first imaging method are intensified.

9. A data processing device as claimed in claim 1, being equipped for executing the following steps:

generating a first transformed image from the first image, in which characteristic image features of the second imaging method are intensified; and generating a second transformed image from the second image, in which, characteristic image features of the second imaging method are reduced.

10. A data processing device as claimed in claim 1, being equipped for executing the following steps:

generating a first transformed image from the first image, in which characteristic image features of the second imaging method are intensified; and generating a second transformed image from the second image, in which characteristic image features of the first imaging method are intensified.

11. A data processing device as claimed in claim 1, where the first transformed image is an image type consistent with output of the first imaging method and where the second transformed image is an image type consistent with output of the second imaging method.

12. A data processing device as claimed in claim 1, where an output from registering the transformed images is configured for use during a surgical operation.

13. A data processing device as claimed in claim 1, where the first imaging method is an ultrasound imaging method and where the second imaging method is a Computer Tomography imaging method or a Magnetic Resonance imaging method.

14. A data processing device as claimed in claim 1, where an imaging method that does supply reliable information is an imaging method not performed in real time and where an imaging method that does not supply reliable information is an imaging method performed in real time.

15. A data processing device as claimed in claim 14, where the first imaging method is not performed in real time and where the second imaging method is performed in real time.

16. A data processing device as claimed in claim 1, which is arranged for using a flexible registration method.

17. A data processing device as claimed in claim 16, where the flexible registration method considers effects of deformation of a tissue of the object or considers an organ shift of an organ of the object.

18. A method, comprising:

generating a first transformed image from a first image obtained from a first imaging method;

generating a second transformed image from a second image obtained for a second imaging method, where characteristic image features of the first imaging method are reduced in the first transformed image or characteristic image features of the second imaging method are intensified in the first transformed image, where characteristic image features of the second imaging method are reduced in the second transformed image or characteristic image features of the first imaging method are intensified in the second transformed image, where the first transformed image and the first image are different images, where the second transformed image and the second image are different images, and where the first imaging method and the second imaging method are different imaging methods; and registering the first transformed image and the second transformed image.

19. A method as claimed in claim 18, wherein generating the first transformed image, generating the second transformed image, and registering the first transformed image and the second transformed image are repeated at least a second time with variation of at least one of the transformed images, in order to maximize a degree of similarity between the transformed images.

* * * * *